United States Patent Office 2,811,435
Patented Oct. 29, 1957

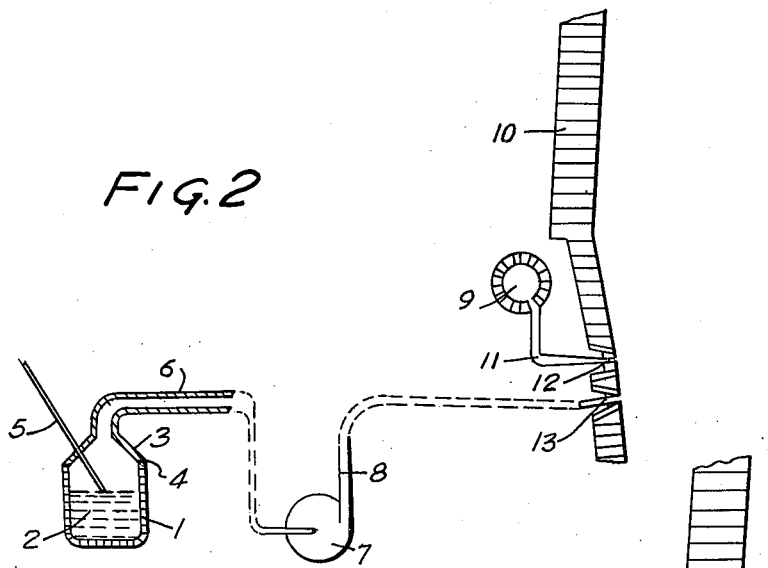
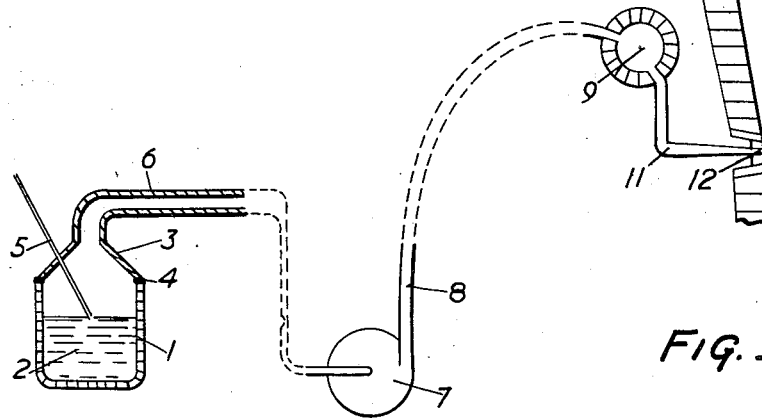

2,811,435

TREATMENT OF FUMES IN STEELMAKING OPERATIONS

Leonard Charles Bannister, South Croydon, and William John Badenoch Chater, Croydon, England, assignors to The British Oxygen Company Limited, a British company Application March 26, 1956, Serial No. 574,024

6 Claims. (Cl. 75—41)

This invention relates to a process and apparatus for the treatment of fumes arising during steelmaking operations and more particularly to the treatment of the brown fumes arising when molten metal is treated with oxygen, such as for example the blowing of oxygen into molten blast furnace metal in a ladle.

Oxygen is used in several ways in steelmaking and is of great value, but with certain methods of application its use is attended by the formation of brown fumes of iron oxide, which settle as dust.

One method of using oxygen in steelmaking is to blow it through a steel pipe, tube or lance, the end of which dips into molten iron or steel or else into the layer of slag floating upon it. The reaction of the oxygen with the molten iron is so vigorous chemically that very high local temperatures are produced, causing a portion of the iron to vaporise and in the surrounding atmosphere become oxidised. It is also possible and likely that oxide is formed before the iron volatilises and this oxide itself becomes carried into the atmosphere by a residue of oxygen which has not been completely absorbed or by carbon monoxide or dioxide. The fume so formed has been analysed by several investigators and is known to consist largely of particles of oxide of iron of dimensions varying between 0.05 micron and 1.0 micron. In composition it is a mixture of $Fe_2O_3$ and $Fe_3O_4$. It may also contain a small proportion, a few percent of $P_2O_5$, $SiO_2$, $MnO$, $CaO$ and other oxides. Since the fume consists mainly of iron oxide and this not being freshly cut, it is probably quite harmless, but if air containing it should be inhaled during a long period it would certainly be objectionable. Furthermore, it greatly reduces visibility in the neighbourhood of the operations which are proceeding. There are thus various reasons why the presence of this fume is a disadvantage, and why it should be removed.

There have been various prior suggestions for the removal of these fumes. In some works this is brought about by installing a special plant to suck the fumes into suitable vessels where the iron oxide is removed either by scrubbing with water or by electrostatic precipitation. Such methods are inevitably rather costly and are a deterrent in the development of processes which involve the use of oxygen.

It is the object of the present invention to provide a method of and apparatus for removing and disposing of these fumes, for utilising the iron which they contain in suspension and also for utilising any excess oxygen which may also be present.

According to one aspect of the present invention, a method for the removal and disposal of fumes arising from the action of oxygen on molten iron or steel comprises confining the fumes within a limited space above the surface of the molten metal, drawing off the fumes from such limited space and delivering them into the lower part of a blast furnace.

According to another aspect of the present invention, apparatus for the removal and disposal of fumes arising from the action of oxygen on molten iron or steel comprises a hood adapted to fit tightly over the vessel containing the molten metal, means, such as, for example, a pump or fan, for drawing off by suction fumes confined within the hood, and means for delivering such fumes into the lower part of a blast furnace.

The fumes may be delivered to the blast furnace either through an additional number of tuyeres located at the same level as the normal tuyeres, or, alternaitvely, they may be introduced by slight excess pressure into the bustle pipe and there mixed with the normal hot blast and passed into the furnace through the normal tuyeres.

The invention will now be more particularly described with reference to the accompanying drawing in which Figure 1 illustrates diagrammatically one method of applying the invention to the removal of fumes arising from the action of oxygen on molten iron in a pretreatment ladle, and Figure 2 illustrates a modification of the method illustrated in Figure 1.

Referring to Figure 1, the ladle 1 containing the molten iron 2 is provided with a conical hood 3, the circumference of the hood being joined to the rim of the ladle in substantially gas-tight manner by a refractory seal 4. An oxygen lance 5 for directing a jet of oxygen or oxygen-enriched air against the molten iron, passes through the wall of the hood 3. A conduit 6 opens at one end into the apex of the hood 3 and is connected at the other end to the inlet of a blower 7. The outlet of the blower 7 is connected by a further conduit 8 with the bustle pipe 9 of a blast furnace, a part of the wall of which is indicated at 10. From the bustle pipe 9, the usual pipes 11 for conducting the blast lead to tuyeres 12 in the wall of the blast furnace.

In operation, fumes arising from the action of the oxygen from lance 5 with the molten iron 2 in the ladle 1 are confined within the hood 3. They are withdrawn from the space within the hood 3 through the conduit 6 by the blower 7 and are thence delivered under a slightly increased pressure through the conduit 8 to the bustle pipe 9. Here they are mixed with the normal hot blast and passed into the furnace through the pipes 11 and tuyeres 12.

In the modification illustrated in Figure 2, the outlet of the blower 7 is connected by conduit 8 not to the bustle pipe of the blast furnace 10 but to one or more additional tuyeres 13 located in the wall of the blast furnace.

A blast furnace is a very efficient means of exchanging heat and because of the large surface of the charge, the small quantity of iron oxide in the fume introduced with the hot blast will be trapped in the descending charge of the furnace. If excess oxygen is present in the fumes removed from the hood 3, it will assist to maintain the temperature in the blast furnace. Although the total weight of iron oxide added with the fumes would not be expected to exceed 5–10% of the total output of the blast furnace, the whole of this will probably be recovered as iron.

We claim:

1. Method for the removal and disposal of fumes arising from the action of oxygen on molten iron or steel which comprises the steps of confining the fumes within a limited space above the surface of the molten metal, drawing off the fumes from said limited space and delivering said fumes into the lower part of a blast furnace.

2. Method for the removal and disposal of fumes arising from the action of oxygen on molten iron or steel which comprises the steps of confining the fumes within a limited space above the surface of the molten metal, drawing off the fumes from said limited space and delivering said fumes into the lower part of a blast furnace through supplementary tuyeres located at the same level as the usual tuyeres of the blast furnace.

3. Method for the removal and disposal of fumes arising from the action of oxygen on molten iron or steel which comprises the steps of confining the fumes within a limited space above the surface of the molten metal, drawing off the fumes from said limited space, compressing said fumes to a pressure slightly in excess of the pressure in the bustle pipe of a blast furnace and introducing the fumes into said bustle pipe, whereby they are introduced into the lower part of said blast furnace with the blast.

4. Apparatus for the removal and disposal of fumes arising from the action of oxygen on molten iron or steel comprising a hood fitted in substantially gas-tight manner over the vessel containing the molten metal, a conduit connecting the interior of said hood to the lower part of a blast furnace and a pump located in said conduit for withdrawing fumes by suction from the interior of said hood and delivering them through said conduit to said lower part of said blast furnace.

5. Apparatus according to claim 4 wherein said conduit connects the interior of said hood with the lower part of said blast furnace through supplementary tuyeres located in the wall of said blast furnace at the level of the normal tuyeres of said blast furnace.

6. Apparatus according to claim 4 wherein said conduit is connected to the bustle pipe of said blast furnace.

References Cited in the file of this patent

UNITED STATES PATENTS

| | | |
|---|---|---|
| 86,247 | Phillips | Jan. 26, 1869 |
| 1,426,054 | Eastabrooke et al. | Aug. 15, 1922 |
| 1,505,281 | Nagelvoort | Aug. 19, 1924 |
| 1,889,757 | Miller | Dec. 6, 1932 |